(12) United States Patent
Wagener et al.

(10) Patent No.: US 10,601,645 B2
(45) Date of Patent: Mar. 24, 2020

(54) METHOD FOR MANAGING AND CONFIGURING FIELD DEVICES OF AN AUTOMATION SYSTEM

(71) Applicant: ABB Schweiz AG, Baden (CH)

(72) Inventors: Dirk Wagener, Stadthagen (DE); Christoph Welte, Neu-Ulm (DE); Marcus Heege, Kaisersesch (DE); Wolfgang Mahnke, Hettenleidelheim (DE); Marko Schlueter, Espelkamp (DE)

(73) Assignee: ABB SCHWEIZ AG, Baden (CH)

( * ) Notice: Subject to any disclaimer, the term of this patent is extended or adjusted under 35 U.S.C. 154(b) by 75 days.

(21) Appl. No.: 15/278,059

(22) Filed: Sep. 28, 2016

(65) Prior Publication Data
US 2017/0093621 A1   Mar. 30, 2017

(30) Foreign Application Priority Data
Sep. 28, 2015 (DE) .......................... 10 2015 116 381

(51) Int. Cl.
*G06F 15/16* (2006.01)
*H04L 12/24* (2006.01)
*G05B 19/05* (2006.01)

(52) U.S. Cl.
CPC .......... *H04L 41/0803* (2013.01); *G05B 19/05* (2013.01); *G05B 2219/15014* (2013.01)

(58) Field of Classification Search
CPC ................ H04L 41/00; H04L 41/0803; G05B 22/15014

USPC .......................................................... 709/220
See application file for complete search history.

(56) References Cited

U.S. PATENT DOCUMENTS

2017/0176982 A1* 6/2017 Lutz ................... G05B 19/4185

OTHER PUBLICATIONS

FDI Cooperation, "FDI—Field Device Integration Technology", Jan. 23, 2012.*
IEC 62769-5, "International: Standard", May 2015.*
S. Husain, T. Alonso, M. Midani and K. Jung, "Remote device management of WiMAX devices in multi-mode multi-access environment," 2008 IEEE International Symposium on Broadband Multimedia Systems and Broadcasting, Las Vegas, NV, 2008, pp. 1-14. (Year: 2008).*

(Continued)

*Primary Examiner* — Melvin H Pollack
*Assistant Examiner* — Messeret F Gebre
(74) *Attorney, Agent, or Firm* — Leydig, Voit & Mayer, Ltd.

(57) ABSTRACT

A method for managing and configuring field devices of an automation system has a configuration tool designed to physically detect a field device in the automation system, to logically integrate said device in the automation system and to configure it in the automation system, wherein for this purpose the configuration tool draws on a predefined first information package that is specific to the field device and describes at least some of the functions and data of the field device. To simplify communication between the configuration tool and the field devices, FDI-based data packages may be formed from the predefined field device-specific information package and transmitted by one or more FDT-based communications components may be exchanged between the configuration tool and the field device.

16 Claims, 1 Drawing Sheet

(56) References Cited

OTHER PUBLICATIONS

Revista Cailor Ferate, "Local control of cr-4 electrodynamic central control systems", pp. 86-94, 1966. (Year: 1966).*

B. A. G. Hillen, I. Passchier, E. F. Matthijssen, F. T. H. den Hartog and F. Selgert, "Remote management of mobile devices with broadband forum's TR-069," Networks 2008—The 13th International Telecommunications Network Strategy and Planning Symposium, Budapest, 2008, pp. 1-7. (Year: 2008).*

J. Han, C. Choi and I. Lee, "More efficient home energy management system based on ZigBee communication and infrared remote controls," in IEEE Transactions on Consumer Electronics, vol. 57, No. 1, pp. 85-89, Feb. 2011. (Year: 2011).*

FDI, Field Device Integration Technology, FDI Cooperation 2011, 23. Jan. 2012, URL: http://www.fdi-cooperation.com/tl_files/images/content/Publications/FDI-White_Paper.pdf.

Finken, F.: FDI-der neue Standard in der digitalen Kommunikation, 30. Technik Treff bei ABB, 15. May 2014, Berlin, URL: https://www.google.de/url?sa=t&rct=j&q=es=web&cd=1&ved=0ahUKEwijzin4nrbNahWMHpoKHXABBB4QFggIMAA&url=https%3A%2F%2Flibrary.e.abb.com%2Fpublic%2F02ab4159727fff95c1257cde002fbec1%2FFDI%2520TT14_Finken.pdf&usg=AFQiCNGWZWxqun_EZqTndRcW5ctc-iv8uQ&cad.

German Examination Report, dated Jun. 21, 2016, German Patent Office, p. 5.

* cited by examiner

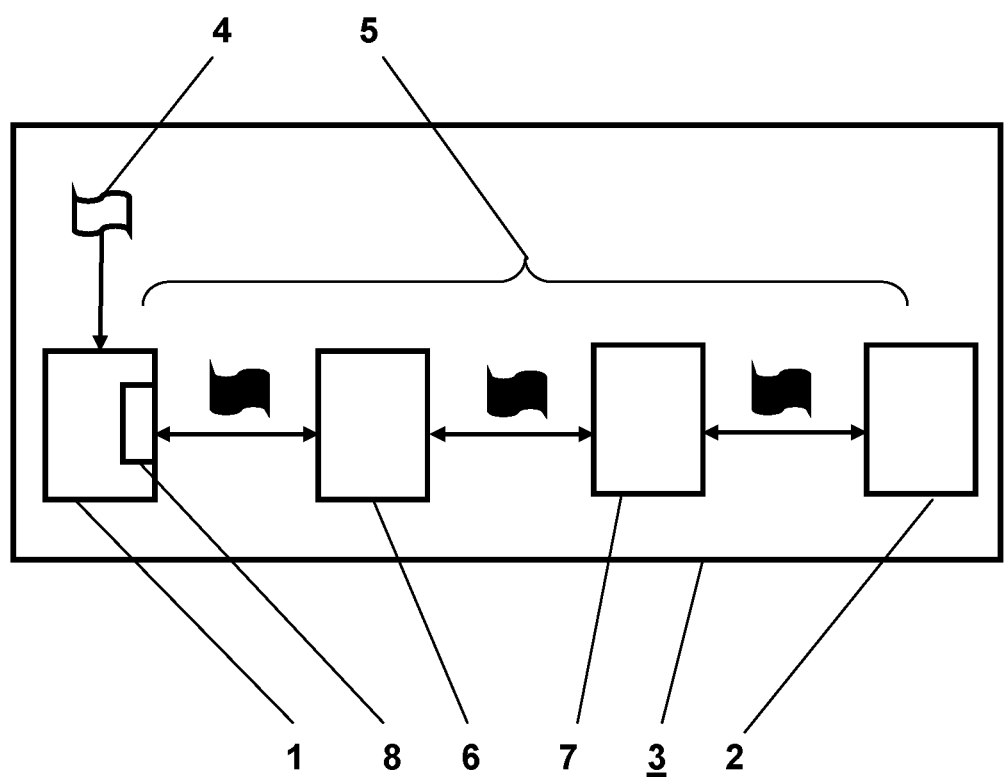

METHOD FOR MANAGING AND CONFIGURING FIELD DEVICES OF AN AUTOMATION SYSTEM

CROSS-REFERENCE TO RELATED APPLICATIONS

Priority is claimed to German Patent Application No. DE 10 2015 116 381.0, filed on Sep. 28, 2015, the entire disclosure of which is hereby incorporated by reference herein.

FIELD

The invention relates to a method for managing and configuring field devices of an automation system.

BACKGROUND

Automation systems for controlling a technical process or a technical system typically comprise a control apparatus (PLC) that is integrated in a group of a plurality of smart electrical devices. Smart electronic devices are those based on microprocessors, such as protective gear and control devices, motor protection devices, smart switches and voltage regulators, frequency converters, pressure and temperature transmitters, flowmeters and actuators.

It is known from the paper "FDI Device Integration—Best of Both Worlds", atp edition June 2010, pages 16 to 19, to integrate field devices in an automation system using an FDI concept (Field Device Integration IEC-62769). This concept is based on providing information on the configuration of field devices in a device-specific FDI package. This FDI package comprises a fixed amount of information, consisting of a device definition, business logic, user interface description and user interface plug-ins. The device definition includes management information and the device model. The business logic describes the communication logic in relation to the device and is used to ensure consistency in the device model. The user interface description describes the representation of the device parameters and device functions. The user interface plug-ins are programmed components of interface portions for displaying the device parameters and functions.

When configuring field devices using EDD (electronic device description) technology IEC 61804, a device manufacturer provides an EDD that contains information on the communication with the device and on the business logic and the user interfaces, i.e. which data entry masks should be displayed to a user. For example, the business logic includes which parameters may be written and when.

The FDI technology uses these mechanisms of the EDD and provides the concept of the FDI package, which, in addition to an EDD, can also contain other information such as the user manual and UIPs (user interface plugins), which provide additional user interfaces in other technologies, e.g. .NET assemblies, which, unlike EDD-based user interfaces, consist of programmed code compiled in relation to a component.

FDI packages are usually created by device manufacturers and used by system producers to integrate and configure the device manufacturers' devices in their system.

Field devices can be configured by means of FDI or FDT technology. In this respect, FDI supports a smaller set of fieldbus technologies than FDT. FDT-based systems, which usually enable communication over the entire fieldbus topology by means of FDT mechanisms, are already on the market and available to consumers. Fieldbus topologies to be configured by means of FDI are limited to the fieldbuses defined in the standard; according to the standard, a specific OPC server that implements FDI communication calls to a corresponding fieldbus protocol is used for communication.

In systems having topologies that use different fieldbuses, not all the topology planes can be implemented by means of FDI. For this purpose, it is necessary each time to create a corresponding OPC server that implements the reproduction of the FDI communication calls to the relevant communication hardware. However, this approach is very complex.

SUMMARY

An aspect of the invention provides a method for managing and configuring one or more field devices of an automation system, the method comprising: physically detecting a field device using a configuration tool designed to physically detect the field device in the automation system, to logically integrate the field device in the automation system and to configure the field device in the automation system, the configuration tool drawing on, for the managing and configuring, a predefined information package that is specific to the field device and describes at least some functions and data of the field device; forming one or more FDI-based data packages from predefined field device-specific information package; and exchanging transmitted FDI-based packages, using one or more FDT-based communications components, between the configuration tool and the field device.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 a configuration tool 1 designed to physically detect a field device 2 in the automation system 3.

DETAILED DESCRIPTION

Therefore, an object of the invention is to disclose a method for managing and configuring field devices of an automation system in a simple manner.

According to an aspect of the invention, the invention is used in particular in process automation or machine control for controlling processes and/or system components.

An aspect of the invention is based on a method for managing and configuring field devices of an automation system having a configuration tool designed to physically detect a field device in the automation system, to logically integrate said device in the automation system and to configure it in the automation system, wherein for this purpose the configuration tool draws on a predefined information package that is specific to the field device and describes at least some of the functions and data of the field device.

According to an aspect of the invention, FDI-based data packages formed from the predefined field device-specific information package and transmitted by means of FDT-based communications components are exchanged between the configuration tool and the field device.

For this purpose, the FDI-based data packages are encapsulated on the transmission path of the FDT-based communications components: "nested communication". Advantageously, FDT enables the display of communication chains across a plurality of communication members, from the configuration tool to the field device via controllers, remote input/output units (remote I/O) and intermediate active network components. In the process, FDI is used to configure the field device whereas nested communication takes place by means of FDT mechanisms. In addition, the solution according to the invention is implemented without specific OPC servers. Advantageously, fieldbus topologies configured by means of FDI can thus be integrated in existing FDT systems.

Specifically, this is done by using an FDT-based communications component, which transfers the reproduction of the FDI-based device communication to FDT-based communications mechanisms by means of OPC. This approach is different from that promoted by the FDI cooperation in that, instead of integrating an FDI-based data package in an FDT DTM by means of a specific OPC server, according to the invention the FDI-based data packages are transmitted in an encapsulated manner by an FDI communication server or a manufacturer-specific interface having FDT mechanisms.

The FDI-based data packages are configured natively in the configuration tool. The FDI-based data packages are encapsulated by an FDT gateway in a manner suitable for a DTM, and are also transported by means of FDT-based communications components. In the devices, the FDI-based data packages received via FDT are unpacked and executed.

An aspect of the invention will be described in more detail below on the basis of an embodiment. The single FIGURE shows a configuration tool 1 designed to physically detect a field device 2 in the automation system 3, to logically integrate said device in the automation system 3 and to configure it in the automation system 3. To do so, the configuration tool 1 draws on a predefined field device-specific information package 4 that describes at least some of the functions and data of the field device 2.

The configuration tool 1 and the field devices 2 of the automation system 3 are interconnected via a communications network 5, over which the information is transmitted by means of FDT-based communications components. The communications network 5 further includes at least one controller 6 and at least one remote input/output unit 7, which are arranged between the configuration tool 1 and the field device 2 of the automation system 3 in the communication path. Furthermore, depending on the network topology, the communications network 5 can comprise additional, intermediate active network components (not shown in the drawing).

FDT describes field devices 2 by means of binary components, whereas FDI describes the field devices 2 by means of an EDD which is mainly text-based. The configuration tool 1 comprises a gateway 8, by means of which the FDI-based data packages are encapsulated in a manner suitable for FDT.

The FDI-based data packages are configured natively in the configuration tool 1. The FDI-based data packages are also transported by means of FDT-based communications components, i.e. at least the controller 6 and the remote input/output unit 7. In the field devices 2, the FDI-based data packages transported via FDT are unpacked and executed.

The invention describes a method of using an FDT-based component to integrate topologies of field devices 2, configured by means of FDI, in communications topologies configured by means of FDT.

In the process, the field devices 2 in the configuration tool 1 are configured using FDI. The FDI-based data packages are mapped on the FDT technology by the gateway 8 and sent to the relevant field device 2 in nested calls by means of the FDT components. In the FDT-based communications components of the communications network 5, i.e. at least the controller 6 and the remote input/output unit 7, the nested calls are unpacked and sent to the next device in the communication chain.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 1 configuration tool
2 field device
3 automation system
4 field device-specific information package
5 communications network
6 controller
7 input/output unit
8 gateway

The invention claimed is:

1. A method for managing and configuring one or more field devices of an automation system, the method comprising:

physically detecting a field device using a configuration tool designed to physically detect the field device in the automation system, to logically integrate the detected field device in the automation system and to configure the detected field device in the automation system, the configuration tool drawing on, for the managing and configuring, a predefined information package that is specific to the detected field device and describes at least some functions and data of the detected field device;

forming, with the configuration tool, an FDI-based data package from the predefined field device-specific information package;

forming, with the configuration tool, an integrated data package comprising (i) a first FDT-based data layer, (ii) a second FDT-based data layer nested within the first FDT-based data layer, and (iii) the FDI-based data package nested within the second FDT-based data layer;

transmitting the FDI-based data package, via one or more FDT-based communications components, from the configuration tool and to the detected field device; and with the detected field device, unpacking and executing the FDI-based data package.

2. The method of claim 1, wherein the FDT-based communications components comprise a first FDT-based component and a second FDT-based component and the transmitting occurs such that:

the first FDT-based component executes the first FDT-based data layer, which causes the first FDT-based component to:
unpack the second FDT-based data layer containing the nested FDI-based data package, and
forward the unpacked second FDT-based data layer containing the nested FDI-based data package to the second FDT-based component;

the second FDT-based component executes the second FDT-based layer, which causes the second FDT-based component to:
unpack the FDI-based data package, and
forward the unpacked FDI-based data package to the detected field device.

3. The method of claim 2, wherein the configuration tool detects a quantity of FDT-based communications components disposed between the configuration tool and the detected field device and forms the integrated data package based on the detected quantity.

4. The method of claim 2, wherein the FDI-based data package, upon being received at the detected field device, is no longer nested within any FDT-based layers.

5. The method of claim 1, wherein the FDT-based communications components comprise a first FDT-based component and a second FDT-based component and the transmitting occurs such that:

the first FDT-based component executes the first FDT-based data layer, which causes the first FDT-based component to:
forward the second FDT-based data layer and the FDI-based data package, but not the first FDT-based data layer, toward the second FDT-based component;

the second FDT-based component executes the second FDT-based layer, which causes the second FDT-based component to:
forward the FDI-based data package, but not the second FDT-based data layer, toward the detected field device.

6. The method of claim 5, wherein the FDI-based data package, upon being received at the detected field device, is no longer nested within any FDT-based layers.

7. The method of claim 1, wherein FDI and FDT are mutually incompatible communications protocols.

8. The method of claim 1, wherein the FDT-based communications components are not configured to execute any FDI-based data packages.

9. A method comprising:
detecting, with a configuration tool, a field device of an automation system;

forming, with the configuration tool, an FDI-based data package based on a predefined information package that is specific to the detected field device and describes at least some functions and data of the detected field device;

forming, with the configuration tool, an integrated data package comprising (i) a first FDT-based data layer, (ii) a second FDT-based data layer nested within the first FDT-based data layer, and (iii) the FDI-based data package nested within the second FDT-based data layer;

transmitting the FDI-based data package, via one or more FDT-based communications components, from the configuration tool and to the detected field device; and with the detected field device, unpacking and executing the FDI-based data package.

10. The method of claim 9, wherein the FDT-based communications components comprise a first FDT-based component and a second FDT-based component and the transmitting occurs such that:

the first FDT-based component executes the first FDT-based data layer, which causes the first FDT-based component to:
unpack the second FDT-based data layer containing the nested FDI-based data package, and
forward the unpacked second FDT-based data layer containing the nested FDI-based data package to the second FDT-based component;

the second FDT-based component executes the second FDT-based layer, which causes the second FDT-based component to:
unpack the FDI-based data package, and
forward the unpacked FDI-based data package to the detected field device.

11. The method of claim 10, wherein the configuration tool detects a quantity of FDT-based communications components disposed between the configuration tool and the detected field device and forms the integrated data package based on the detected quantity.

12. The method of claim 10, wherein the FDI-based data package, upon being received at the detected field device, is no longer nested within any FDT-based layers.

13. The method of claim 9, wherein the FDT-based communications components comprise a first FDT-based component and a second FDT-based component and the transmitting occurs such that:

the first FDT-based component executes the first FDT-based data layer, which causes the first FDT-based component to:
forward the second FDT-based data layer and the FDI-based data package, but not the first FDT-based data layer, toward the second FDT-based component;

the second FDT-based component executes the second FDT-based layer, which causes the second FDT-based component to:
forward the FDI-based data package, but not the second FDT-based data layer, toward the detected field device.

14. The method of claim 13, wherein the FDI-based data package, upon being received at the detected field device, is no longer nested within any FDT-based layers.

15. The method of claim 9, wherein FDI and FDT are mutually incompatible communications protocols.

16. The method of claim 9, wherein the FDT-based communications components are not configured to execute any FDI-based data packages.

* * * * *